(12) United States Patent
Kung

(10) Patent No.: US 6,910,549 B2
(45) Date of Patent: Jun. 28, 2005

(54) EMBEDDED MULTIMEDIA SPEAKER STRUCTURE

(76) Inventor: Hsien-Chin Kung, P.O. Box No. 6-57, Junghe, Taipei 235 (TW)

( * ) Notice: Subject to any disclaimer, the term of this patent is extended or adjusted under 35 U.S.C. 154(b) by 93 days.

(21) Appl. No.: 10/461,466

(22) Filed: Jun. 16, 2003

(65) Prior Publication Data

US 2004/0251078 A1 Dec. 16, 2004

(51) Int. Cl.[7] .......................... A47B 81/06; H05K 5/02; H04R 5/02; H04R 1/02; G06F 1/16
(52) U.S. Cl. .................. 181/199; 181/148; 381/301; 381/333; 381/335; 381/186; 381/388; 361/686; 361/683
(58) Field of Search ................................ 181/199, 148, 181/144, 147; 381/10, 301, 302, 305, 333–335, 345, 186, 386, 388, 395; D14/204, 221, 258, 214, 224; 361/680–686, 695

(56) References Cited

U.S. PATENT DOCUMENTS

| | | | | |
|---|---|---|---|---|
| 4,146,745 A | * | 3/1979 | Froeschle et al. | 181/147 |
| 4,332,986 A | * | 6/1982 | Butler | 181/199 |
| 4,843,624 A | * | 6/1989 | Rashak | 181/199 |
| 4,942,939 A | * | 7/1990 | Harrison | 181/199 |
| 5,067,159 A | * | 11/1991 | Kasai et al. | 181/144 |
| 5,119,497 A | * | 6/1992 | Freige et al. | 361/685 |
| 5,269,598 A | * | 12/1993 | Liu | 361/683 |
| 5,321,756 A | * | 6/1994 | Patterson et al. | 381/308 |
| 5,657,202 A | * | 8/1997 | Ma | 361/683 |
| 5,710,821 A | * | 1/1998 | Cheah | 181/199 |
| 6,011,852 A | * | 1/2000 | Howard | 381/300 |
| 6,191,942 B1 | * | 2/2001 | Lee et al. | 381/388 |
| 6,243,260 B1 | * | 6/2001 | Lundgren et al. | 381/386 |
| 6,345,685 B1 | * | 2/2002 | Wells et al. | 181/199 |
| 6,546,298 B1 | * | 4/2003 | Bull | 381/332 |
| 6,798,654 B2 | * | 9/2004 | Chang et al. | 361/686 |

* cited by examiner

Primary Examiner—Edgardo San Martin
(74) Attorney, Agent, or Firm—Troxell Law Office, PLLC

(57) ABSTRACT

An embedded multimedia speaker structure includes a five-facet housing having a same dimension as that of a 5-and-¼-inch disk drive; a recess disposed at a bottom center portion of the housing; a bass speaker disposed at the recess and having a bell thereof facing downward; a circuit board having play function disposed at an rear end of an interior of the housing and for controlling sounds; a panel enclosing a front end of the housing, and having a speaker provided at two sides thereof, respectively; and two sound guide tubes having an end thereof connected to a rear end of the speakers, respectively, and the other end thereof arranged to an exterior of the housing, respectively. Using the aforesaid structure, a multimedia speaker is assembled for disposing within a 5-and-¼-inch disk drive housing.

5 Claims, 7 Drawing Sheets

EMBEDDED MULTIMEDIA SPEAKER STRUCTURE

BACKGROUND OF THE INVENTION (a) Field of the Invention

The invention relates to an embedded multimedia speaker structure, and more particularly, to a speaker especially for assembling to a disk drive housing without occupying space of a desktop, thereby making peripherals of the computer more well-organized and artistic in appearance, as well as increasing usable area of the desktop.

(b) Description of the Prior Art

Current computer speakers on the market are independent computer peripherals that generally come in a number of two, and are disposed at two sides of a computer desk or a computer host. Rear ends of the speakers are plugged with wires connecting to speaker sockets at a rear end of the computer for balanced sound effects. However, in order to obtain optimal sound effects, it is inevitable that the speakers have rather large volumes, which occupy a great portion of an area on the desk. The speakers may be alternatively placed under the desk, but sound effects then become unsatisfactory and ground space is yet occupied. These are shortcomings of prior speakers. Suppose volumes of the speakers are decreased, it is likely that the comparatively smaller speakers have inadequate sound effects, and thus adding another drawback to the prior invention. Therefore, multimedia speakers occupying minimal space on a desktop while also offering excellent stereophonic effects are needed.

SUMMARY OF THE INVENTION

The primary object of the invention is to provide an embedded multimedia speaker for directly assembling within a 5-and-¼-inch disk drive housing. The speaker is joined with a computer host without requiring additional arrangement thereof on a desktop, and thus saving space of the desktop for neatness and pleasing appearance. The characteristics of the invention further comprise better stereophonic effects in harmony with attentive assembly and coordination.

To achieve the aforesaid object, the invention comprises five-facet housing having a same dimension as a 5-and-¼-inch disk drive; a recess disposed at a bottom center portion of the housing; a bass speaker disposed at the recess and having a bell thereof facing downward; a circuit board having play function disposed at a rear end of an interior of the housing and for controlling sounds; a panel enclosing a front end of the housing, and having a speaker provided at two sides thereof, respectively; and two sound guide tubes having an end thereof connected to a rear end of the speakers, respectively, and the other end thereof arranged to an exterior of the housing, respectively. Using the aforesaid structure, a multimedia speaker is assembled for disposing within a 5-and-¼-inch disk drive housing without occupying additional space of a desktop.

DETAILED DESCRIPTION OF THE PREFERRED EMBODIMENTS

To better understand the contents of the invention, detailed descriptions shall be given with the accompanying drawings hereunder.

Figure 1:
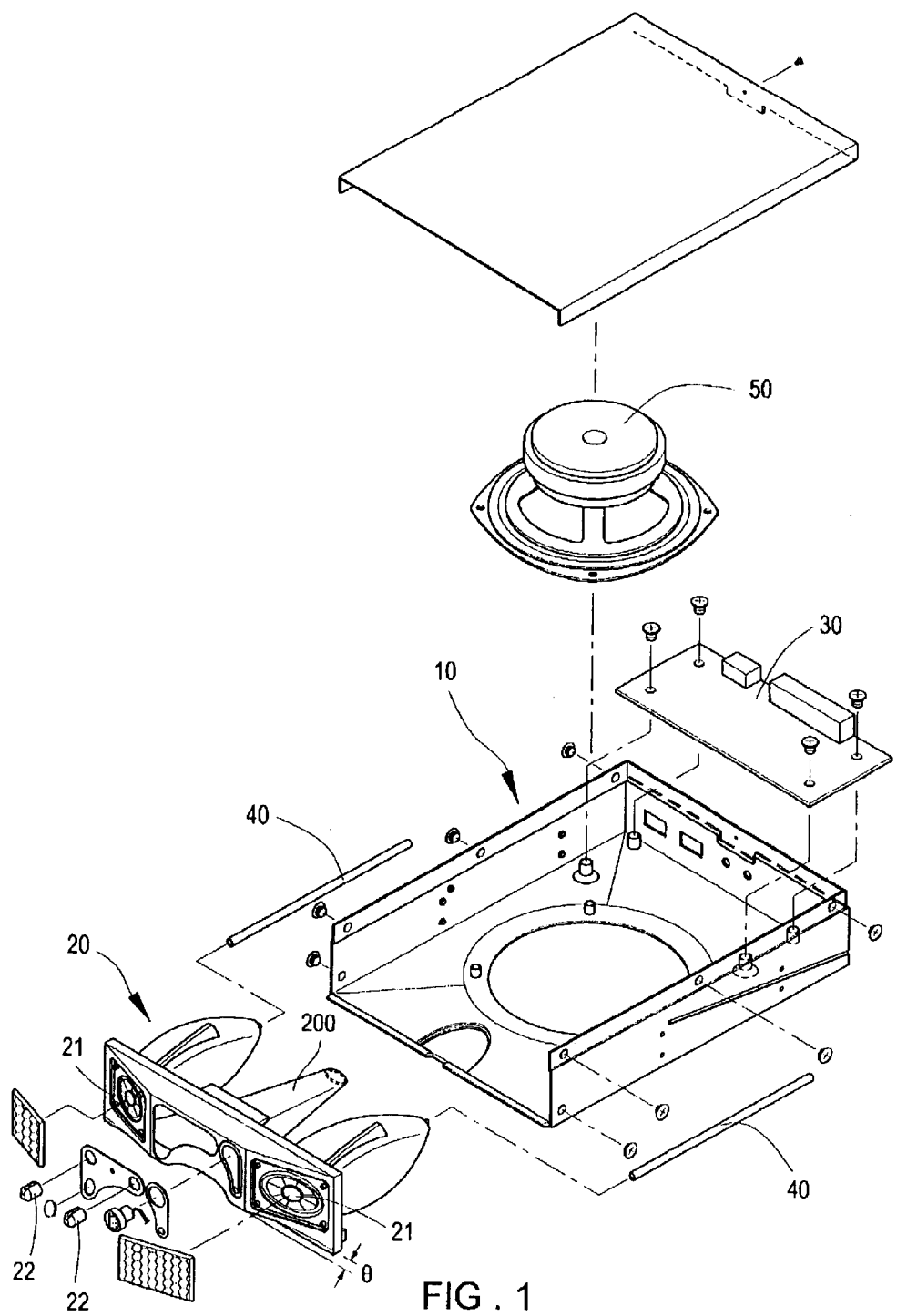
FIG. 1 shows an exploded structural view according to the invention.
Figure 2:
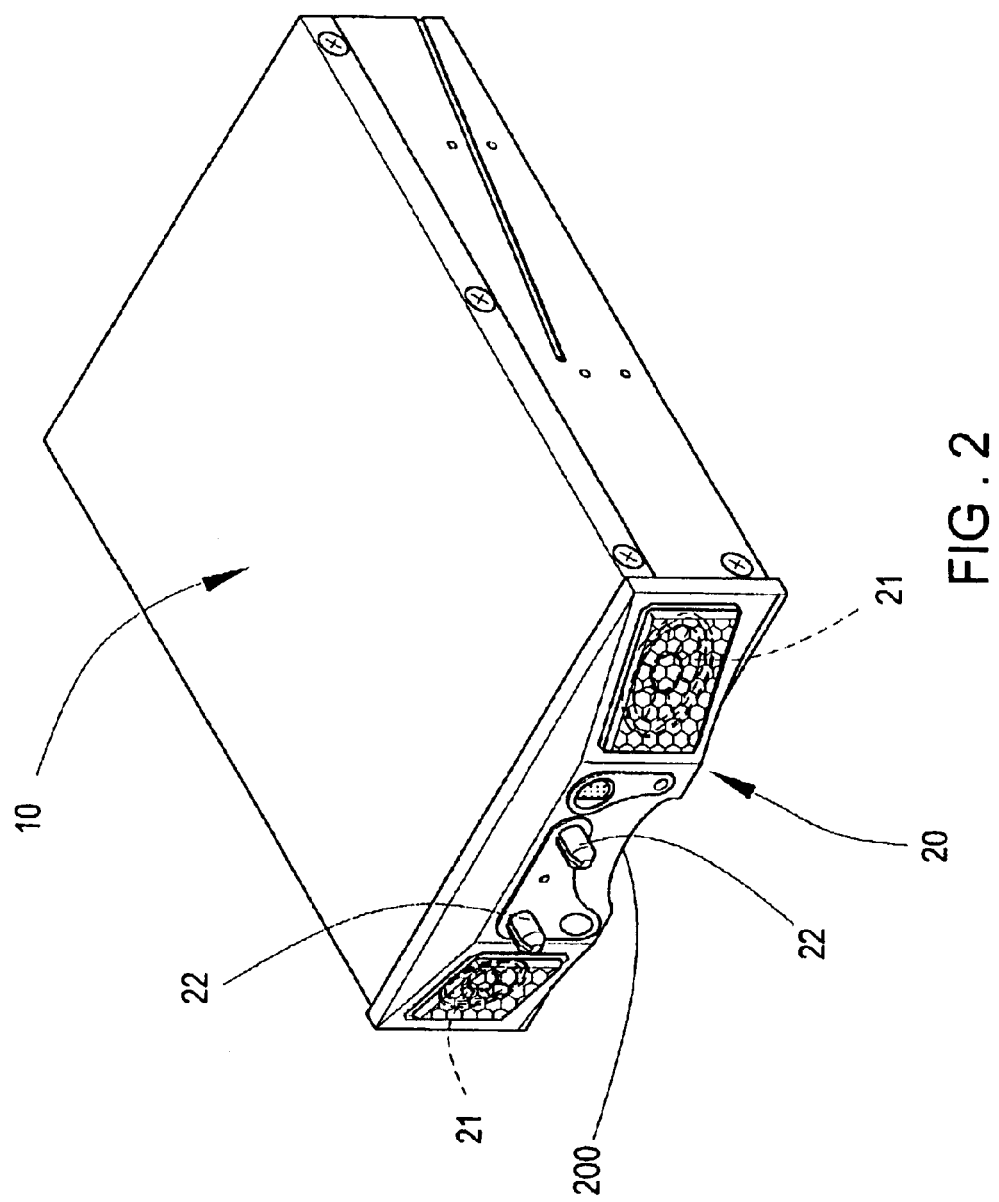
FIG. 2 shows an elevational structural view according to the invention.
Figure 4:
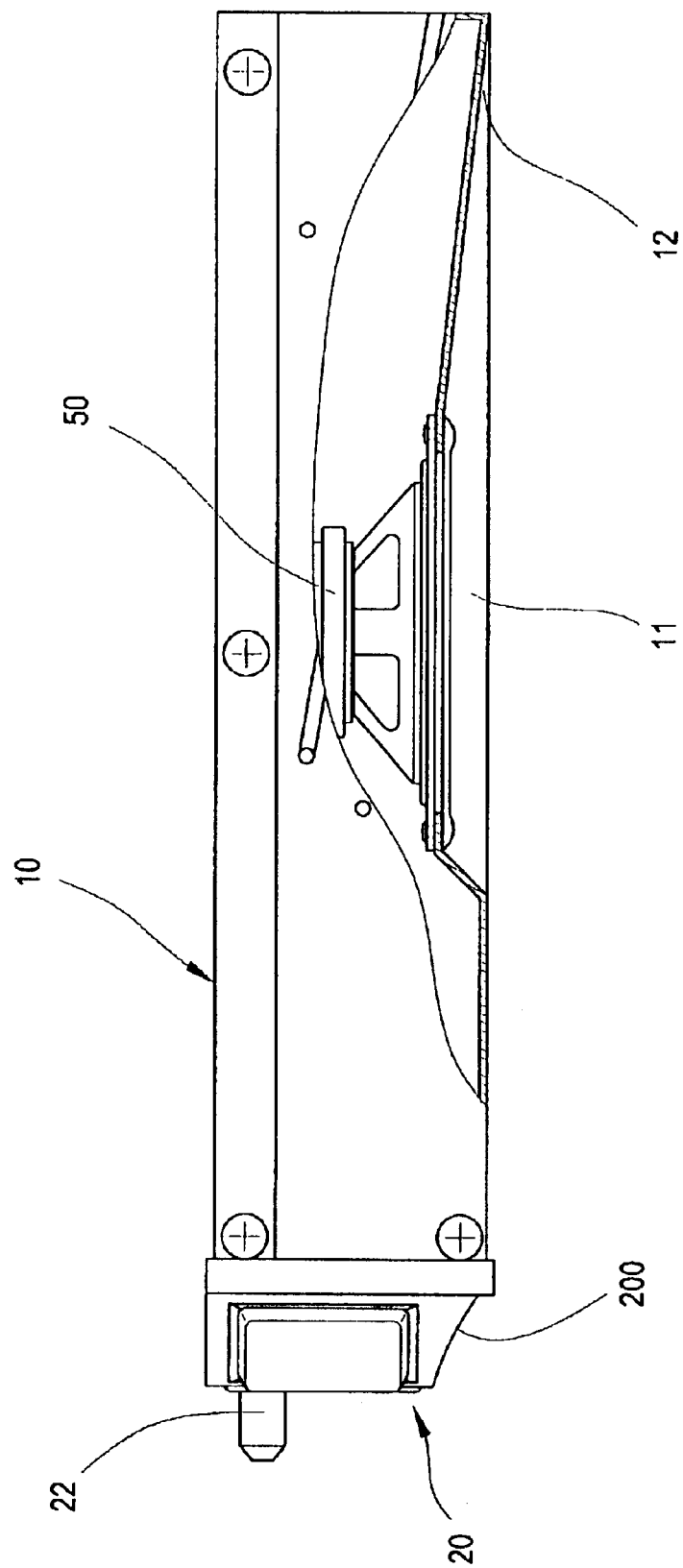
FIG. 4 shows a partial sectional top view according to the invention.
Figure 6:
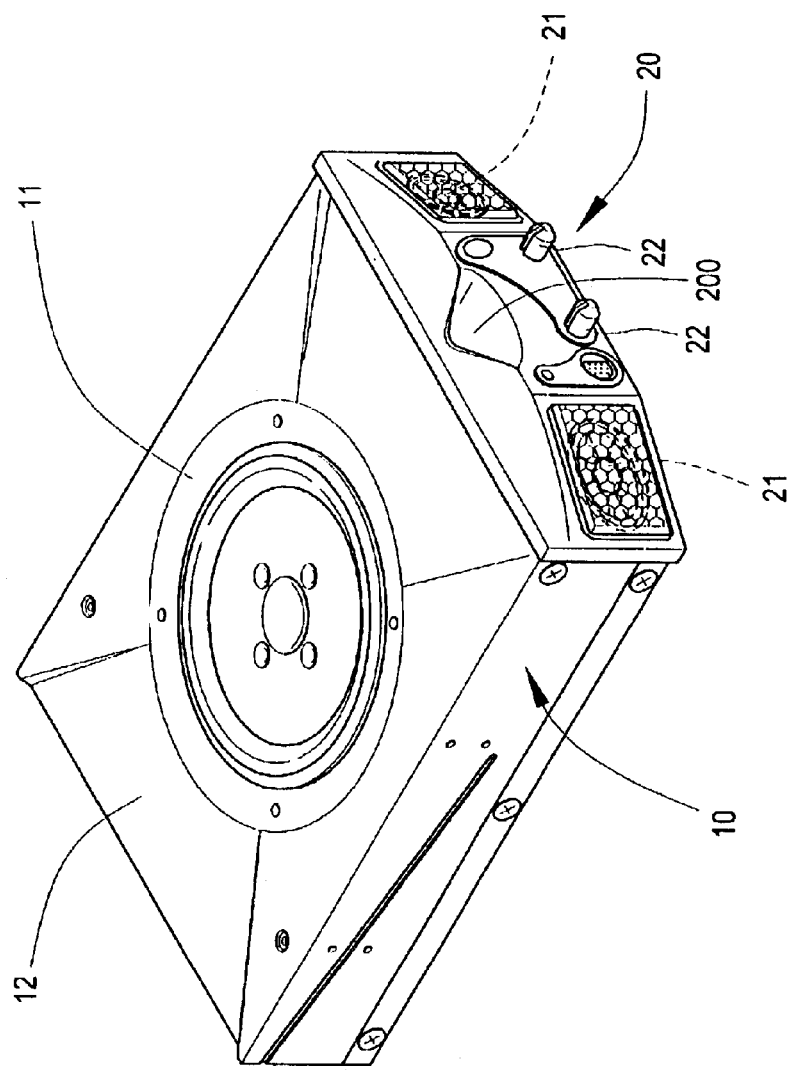
FIG. 6 shows an elevational view illustrating a housing being turned upside-down so as to have a bass speaker face upward according to the invention.

Referring to FIGS. 1, 2 and 6, the invention comprises a five-facet housing 10 having a same dimension as a 5-and-¼-inch disk drive, wherein a bottom center portion of the housing 10 is provided with a recess 11 for accommodating a bass speaker 50. The bass speaker 50 has a bell thereof facing downward, such that a sufficient space is reserved in front of the bass speaker 50 for releasing pressure, and forward acoustic waves are allowed with a certain space for discharging as shown in FIG. 4. Referring to FIGS. 4 and 6, a rear end of the recess 11 is sunken and provided with a pressure-releasing groove 12 having an appropriate width for dismissing sound pressure to a rear end thereof. In addition, referring to FIGS. 1 and 2, a circuit board 30 having play function is disposed at an inner rear end of the housing 10.

Figure 3:
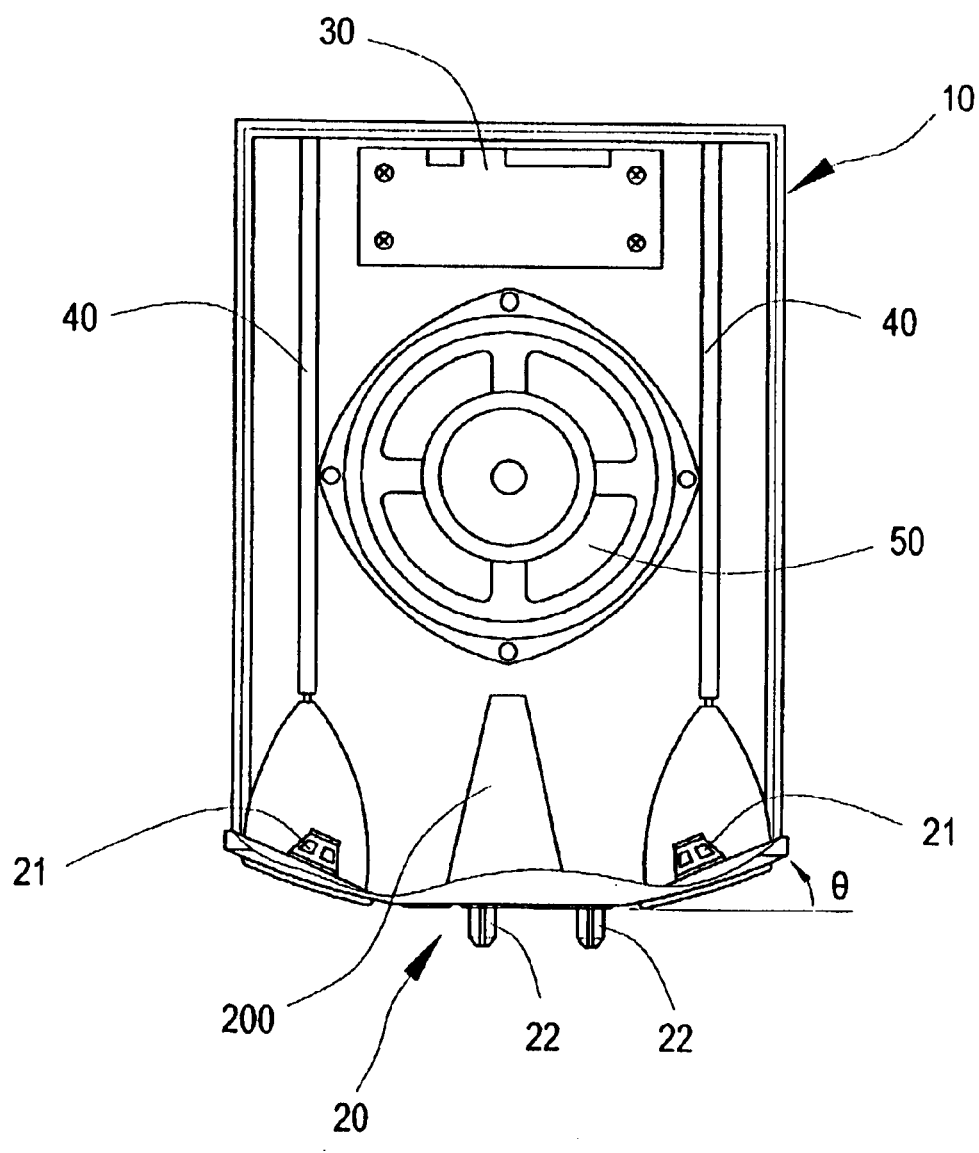
FIG. 3 shows a planar structural view according to the invention.

Referring to FIGS. 1, 2 and 3, a panel 20 is used for enclosing a front end of the housing 10, and has a sound guide tube 200 extended toward a center within the housing 10, so as to transmit sounds of the bass speaker 50 to the front end. A speaker 21 is provided at two sides of the panel 20, respectively, and an outer side of each speaker 21 is inclined toward a rear thereof at an inclined angle θ between 10 and 20 degrees, so that sounds are spread outward for better stereophonic presence effects. Furthermore, two sound guide tubes 40 have an end thereof connected to a rear end of left and right speakers 21, respectively, and the other end thereof arranged to an exterior of the housing 10, respectively. The sound guide tubes 40 are for forwarding currents of reverse acoustic waves of the left and right speakers 21 to an exterior, and for suppressing shifting of cavity resonance frequency in the two speakers 21 caused by large sound pressure. Also, the exterior of the panel 20 is disposed with a plurality of tuning switches 22.

Figure 7:
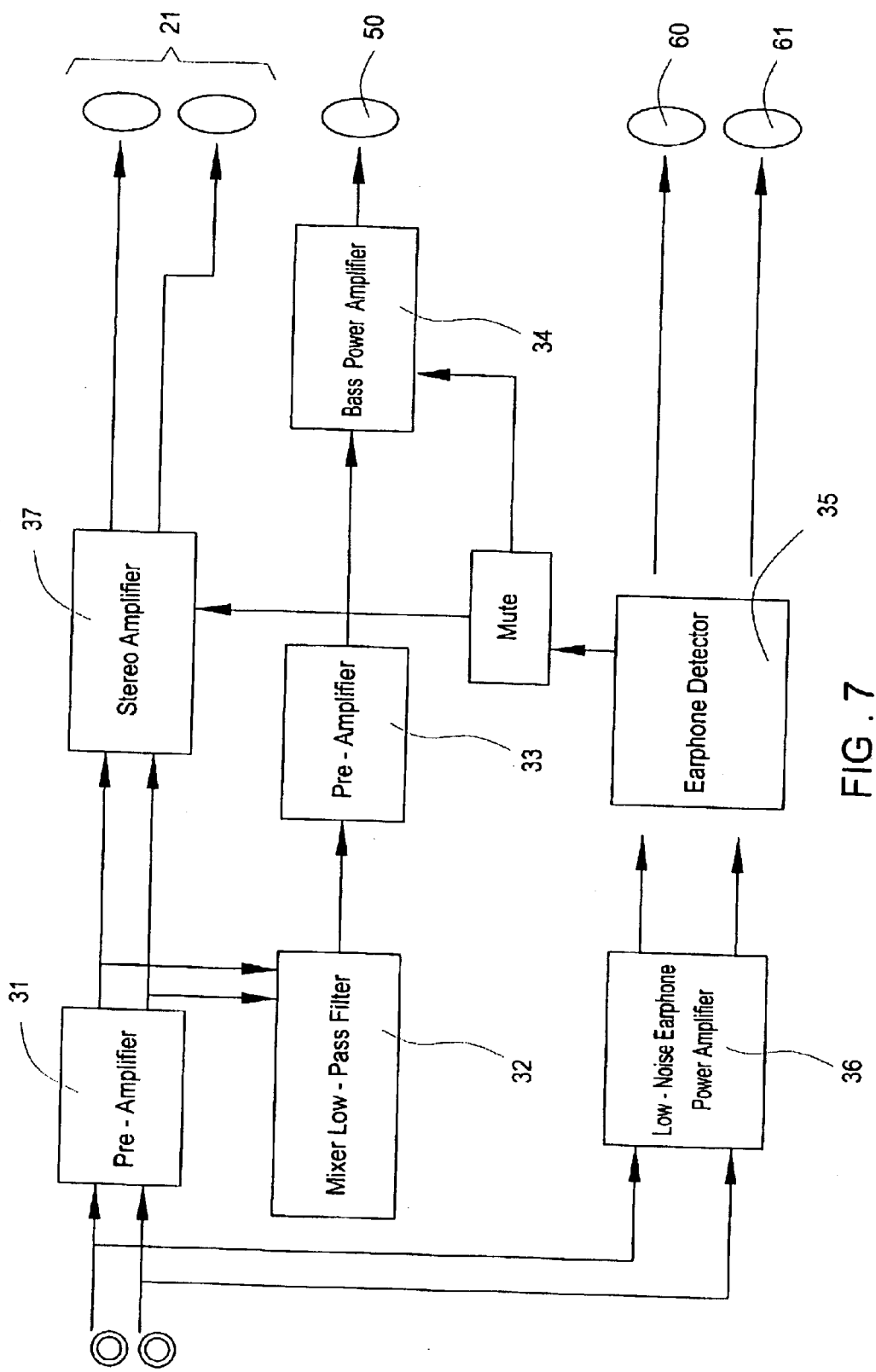
FIG. 7 shows a circuit block diagram illustrating a circuit board and related components according to the invention.

FIG. 7 shows a circuit block diagram of a circuit board 30 and related components thereof according to the invention. Referring to FIGS. 1 and 7, a portion of stereo sound signals is amplified via a pre-amplifier 31 and divided into two parts. One part is amplified via a stereo amplifier 37 and forwarded to the internal left and right speakers 21. The other part is passed through a mixer low-pass filter 32, inverted 180 degrees by a pre-amplifier 33, forwarded to a bass power amplifier 34 and the bass speaker 50, and thus completing driving of the internal speakers. The other portion of stereo sound signals is delivered to a low-noise earphone power amplifier 36 for driving earphones 60 in order to provide stereo sounds, or to provide a microphone 61 with sounds. Moreover, an additional earphone detector 35 is disposed for determining if the internal speakers 21 are mute by detecting whether the earphones 60 are inserted or not.

Figure 5:
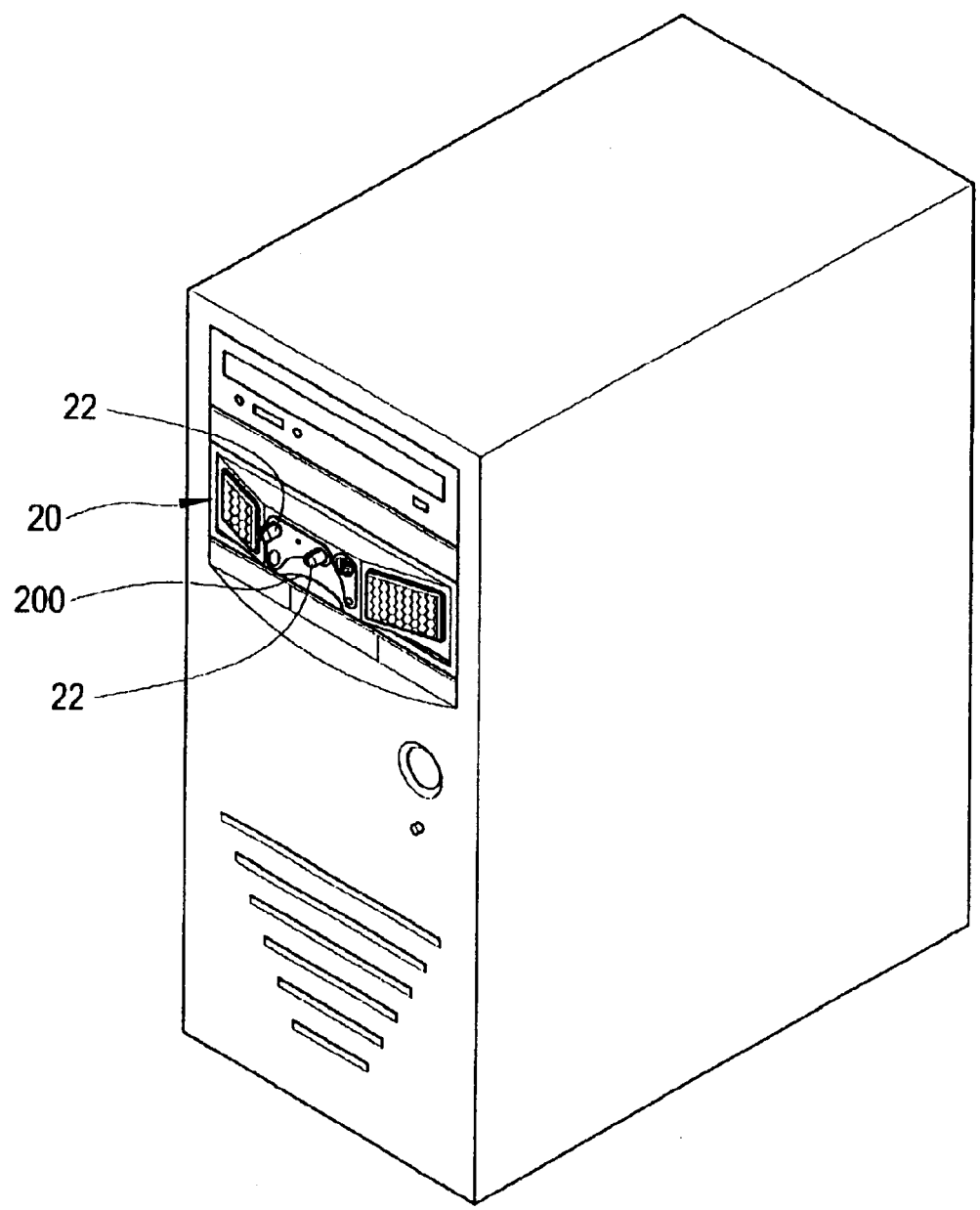
FIG. 5 shows an embodiment according to the invention.

Referring FIG. 5, an embodiment according to the invention may directly be assembled within a 5-and-¼-inch disk drive housing, and has the following excellences:

1. The invention has a dimension same as that of a disk drive and may be directly assembled to a computer host, and hence space occupied on a desktop is economized to further provide neatness and pleasing appearance.
2. According to the invention, a bass speaker is provided therein for discharging forward acoustic waves, small speakers having inclined angles toward rear ends thereof are arranged at the two front sides for obtaining stereophonic sound effects, and sound guide tubes at the rear are capable of minimizing noises as well as providing sound discharging functions.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. An embedded multimedia speaker structure comprising:
    a) a housing having:
        i) a recess located in a bottom thereof; and
        ii) a pressure releasing groove communicating with the recess and an exterior of a rear of the housing;
    b) a base speaker located in the recess of the housing and positioned a predetermined distance from a bottom of the housing;
    c) a panel connected to a front of the housing and having:
        i) at least two speakers;
        ii) a sound guide tube extending toward the rear of the housing and being located between the at least two speakers, the sound guide tube receiving sounds from the bass speaker; and
        iii) a plurality of tunning switches located between the at least two speakers;
    d) two sound tubes, each of the two sound tubes having a first end connected to one of the two speakers and a second end communicating with the exterior of the rear of the housing; and
    e) a circuit board with a play function receiving stereo signals and being electrically connected to and controlling the base speaker and the at least two speakers.

2. The embedded multimedia speaker structure according to claim 1, wherein the bass speaker has a bell facing downwardly.

3. The embedded multimedia speaker structure according to claim 1, wherein each of the at least two speakers has an outer edge inclined a predetermined angle toward the rear of the housing.

4. The embedded multimedia speaker structure according to claim 3, wherein the predetermined angle is between 10 degrees and 20 degrees.

5. The embedded multimedia speaker structure according to claim 1, wherein the circuit board includes:
    a) a first pre-amplifier;
    b) a stereo amplifier electrically connected to the first pre-amplifier and each of the at least two speakers;
    c) a second amplifier;
    d) a mixer low-pass filter electrically connected to the first pre-amplifier and the second amplifier;
    e) a bass power amplifier electrically connected to the second amplifier and the base speaker;
    f) a low-noise earphone power amplifier; and
    g) an earphone detector electrically connected to the low-noise earphone power amplifier, the stereo amplifier, the bass power amplifier, and a device selected from a group consisting of an earphone, a microphone, and a combination thereof, the earphone detector controlling a mute function of the stereo amplifier and the bass power amplifier.

* * * * *